(12) United States Patent
Takeshita et al.

(10) Patent No.: US 6,379,786 B1
(45) Date of Patent: Apr. 30, 2002

(54) LIGNEOUS FINISHING MATERIAL

(75) Inventors: Michitaka Takeshita; Sei Aoki, both of Tokyo; Hideshi Yanagi, Kanagawa-ken; Takeichi Yoshida, Saitama-ken; Masanori Abe, Kanagawa-ken, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/341,256

(22) PCT Filed: Mar. 27, 1998

(86) PCT No.: PCT/JP98/01414

§ 371 Date: Jul. 15, 1999

§ 102(e) Date: Jul. 15, 1999

(87) PCT Pub. No.: WO99/28101

PCT Pub. Date: Jun. 10, 1999

(30) Foreign Application Priority Data

Nov. 28, 1997 (JP) .............................................. 9-344447
Nov. 28, 1997 (JP) .............................................. 9-344448

(51) Int. Cl.⁷ ................................................ B32B 3/26
(52) U.S. Cl. ................................ 428/312.6; 428/292.1; 428/311.1; 428/300.4; 428/340; 428/341
(58) Field of Search ................................ 428/527, 534, 428/529, 526, 531, 533, 528, 536, 530, 537.1, 535, 524, 532, 537.5, 300.4, 340, 341, 292.1, 311.1, 312.6

(56) References Cited

U.S. PATENT DOCUMENTS

| 3,960,639 A | * | 6/1976 | Kudo | ........................ 156/222 |
| 4,555,544 A | * | 11/1985 | Meyer et al. | ............... 524/595 |
| 4,865,912 A | * | 9/1989 | Mitsumata | .................. 428/285 |

FOREIGN PATENT DOCUMENTS

| JP | 09-052316 | 2/1997 |
| JP | 09-052317 | 2/1997 |
| JP | 09-052318 | 2/1997 |
| JP | 09-117903 | 5/1997 |
| JP | 10-205057 | 8/1998 |

* cited by examiner

Primary Examiner—Blaine Copenheaver
Assistant Examiner—Chris Paulraj
(74) Attorney, Agent, or Firm—Jordan and Hamburg LLP

(57) ABSTRACT

A ligneous finishing material including a base plate, a sheet formed from a sheet base impregnated with a thermosetting resin and attached to the base plate, and a decorative sheet impregnable with a resin and attached to the sheet. The base plate, sheet and decorative sheet are laminated on each other by a hot-press process. The thermosetting resin is preferably a phenol resin having a fluidity in a pre-pregnated state of 3% to 50%. The ligneous finishing material is inexpensive and highly resistant to surface damaging, and can be used as a surface facing material for floors, etc., and as a facing material for fittings and furnishings.

2 Claims, 2 Drawing Sheets

LIGNEOUS FINISHING MATERIAL

FIELD OF THE INVENTION

The present invention relates to a ligneous finishing material suitably usable as a facing material for floors, walls, ceilings, cabinets, furniture, an interior material for automobiles, and as a facing material for various fittings and furnishings.

Recently, ligneous finishing materials have been more and more widely used to prevent mites and ticks from appearing inside houses. However, such ligneous finishing materials are required to have an improved dent resistance. Generally, the ligneous finishing material comprises a base plate having laminated thereon a decorative sheet formed from a thin wood plate and which is processed by WPC (wood and plastic combination) to prevent the decorative sheet surface from easily being dented. The WPC process is such that a decorative sheet placed in a heating and pressurizing vessel is forcibly impregnated with a plastic and it is applied with an adhesive and then fixed or laminated to a base plate by hot-press.

The conventional ligneous finishing materials manufactured by the WPC process are expensive.

SUMMARY

Accordingly, it is an object of the present invention to overcome the above-mentioned drawbacks of the prior art by providing a ligneous finishing material which is inexpensive and not easily dentable.

The above object can be attained by providing a ligneous finishing material comprising, according to the present invention, a base plate; a sheet formed from a sheet base impregnated with a thermosetting resin; and a decorative sheet impregnable with a resin, these layer components being laminated on each other by a hot-press process; the thermosetting resin being a phenol resin of which the fluidity in a pre-pregnated (or pre-impregnated) status is 2 to 50% preferably 3% to 50%.

Also, the above object can be attained by providing a ligneous finishing material comprising, according to the present invention, a base plate; a sheet formed from a sheet base impregnated with a thermosetting resin; and a decorative sheet impregnable with a resin; these layer components being laminated on each other by a hot-press process; the sheet being formed from a sheet base impregnated with a thermosetting resin to have a solid content of 50 to 500 g/m$^2$ and thereafter dried to a half-cured state.

Further, the above object can be attained by providing a ligneous finishing material comprising, according to the present invention, a base plate; a sheet formed from a sheet base impregnated with a thermosetting resin; and a decorative sheet impregnable with a resin; these layer components being laminated on each other by a hot-press process; the sheet being a glass nonwoven fabric made of only glass fiber or a mixture of glass fiber and other fiber and impregnated with a thermosetting resin.

Moreover, the above object can be attained by providing a ligneous finishing material comprising, according to the present invention, a base plate; a sheet formed from a sheet base impregnated with a thermosetting resin; and a decorative sheet impregnable with a resin; these layer components being laminated on each other by a hot-press process; the sheet having a tensile strength at break of 10 kgf/cm$^2$ or more after it has been hot-pressed at a temperature of 150° C. and with a pressure of 10 kgf/cm$^2$ for a time of 5 min.

DETAILED DESCRIPTION

Figure 1:
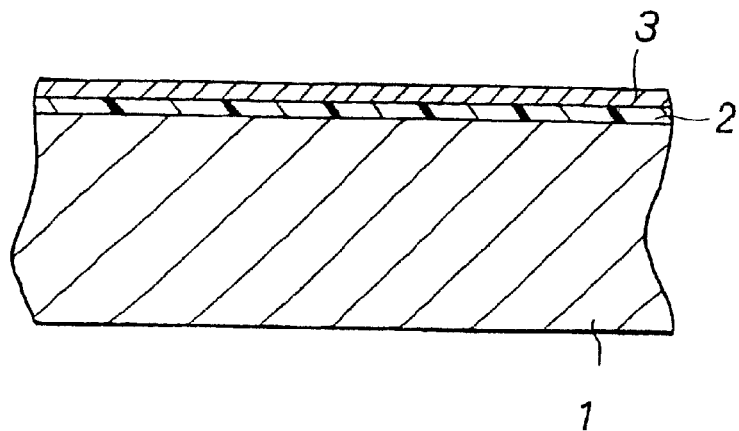
FIG. 1 is a sectional view of a preferred embodiment of ligneous finishing material according to the present invention.

Referring now to FIG. 1, there is schematically illustrated a preferred embodiment of ligneous finishing material according to the present invention. As shown, the ligneous finishing material comprises a base plate 1, a sheet 2 impregnated with a thermosetting resin and attached to the base plate 1, and a decorative sheet 3 attached to the sheet 2.

The base plate 1 should preferably be formed from a wood plate impregnable with the resin, such as a plywood, wooden fiber board, particle board, wafer board or a composite board of them. The sheet 2 comprises a sheet base 20 (see FIG. 2) formed from a sheet of paper, woven fabric or a nonwoven fabric. When the sheet base 20 is formed from a sheet of paper impregnable with a thermosetting resin, the paper should preferably be a gypsum board paper, kraft paper or rayon paper. A woven fabric, if used to form the sheet base 20, should preferably be one formed from an inorganic fiber such as glass fiber, carbon fiber, inorganic whisker, rock fiber, rock wool or the like. Also, a nonwoven fabric suitably usable to form the sheet base 20 should be prepared from glass fiber, cotton fiber, rayon fiber or the like. In this case, the raw fibers are formed to be a sheet by a mechanical, chemical, thermal or solvent-aided method or a combination of these methods, in each of which the fibers are bonded and/or entangled together. The fiber material should preferably be formed from a mat of fibers cut to a length of 3 to 50 mm and bound with a binder resin by a wet paper making method or dry nonwoven fabric making method. The fiber material may be a glass fiber or one or a mixture of two or more selected from inorganic fibers including glass fiber, alumina fiber, alumina silica fiber, carbon fiber, metallic fiber, etc. and organic fibers including aramid fiber, rayon fiber, vinylon fiber, nylon fiber, polyester fiber, polypropylene fiber, polyethylene fiber, etc. When the strength of the sheet base, resin impregnability, etc. are taken into account, it is more preferable to use the glass fiber as the fiber material for the sheet base 20. Further, the basic weight should preferably be 10 to 1,000 g/m$^2$, and more preferably 50 to 250 g/m$^2$ from the standpoints of impregnability, defoamability, strength, ease of handling and dent resistance of molding. If the basic weight is smaller than 10 g/m$^2$, no sufficient dent resistance can be assured for the sheet base 20. On the contrary, if the basic weight is larger than 1,000 g/m$^2$, the sheet base 20 is less impregnable. If the fiber is shorter than 3 mm, it shows no sufficient effect of reinforcement. If the length is greater than 50 mm, the fibers cannot form a uniform sheet. As a result, no good effect of reinforcement can be assured. From the standpoints of strength (reinforcement) and nonwoven fabric uniformity, the short fibers of 3 to 15 mm in length should preferably be contained in an amount of 20 to 100% of the whole mixture of fibers. Short fibers of less than 20% in amount cannot result in any uniform nonwoven fabric. These fibers may be mixed with other short cellulose pulp fiber or the like. Also, coating the glass fiber surfaces with a silane coupling agent can effectively enhance the effect of reinforcement.

The thermosetting resin for impregnation into the sheet base 20 should be one having a characteristic required for the facing material. For example, it should be one selected from phenol resin produced by reaction between a phenol and aldehyde, epoxy resin produced by adding a curing agent to an oligomer having an unreacted end epoxy group, thermosetting ethylene-vinyl acetate copolymer, urea resin, melamine resin, urethane resin, DAP (diallyl phthalate) resin, unsaturated polyester resin, etc. One or a mixture of two or more selected from these resins is combined with the fiber material mainly by impregnation. The resin solution for impregnation into the sheet base 20 of the fibers may be an aqueous solution, solvent varnish or emulsion. Alternatively, it may be a powder of solid resin. From the standpoints of costs and safety, the resin solution should preferably be one dissolved, for example, in water or alcohol. Alcohol, if used for this purpose, should preferably be MeOH since it has a low boiling point and easily volatile.

Furthermore, the above thermosetting resin may be mixed with fillers such as zinc stearate, dibutyl tin dilaurate, carbon black, calcium carbonate, titanium white, mica, glass corpuscle, aluminum hydroxide, tri-(2,3 dibromopropyl) phosphate, aliphatic sulphonate, higher alcohol acid ester, thermal stabilizer, reinforcement, flame retardant, antistatic agent, etc.

A phenol resin, if selected as the thermosetting resin, should preferably be produced using as a catalyst, alkyl amine, ammonia, sodium hydroxide, barium hydroxide or the like. Of them, alkyl amine and ammonia have larger molecular weights than the other two and are less combinable with water because of their molecular structure. Therefore, any one of them, used as the thermosetting resin, drastically improves the water resistance of the sheet base 20 after the lamination. For a higher impregnability, the phenol resin used as the thermosetting resin should preferably be dissolved or dispersed in solvent such as water or an organic solvent to have an undissolved solid content of 20 to 80% by weight of the solvent. As an organic solvent for the dissolution or dispersion of the phenol resin, one or a mixture of two or more selected from lower alcohols such as methanol, ethanol, etc., ketones including acetone, methyl ethyl ketone, etc., toluene, xylene and the like, should be used since they have a high capability of dissolving the phenol resin. A lower alcohol having a low boiling point, especially, methanol, should preferably be used with special consideration given to its dryability. If the undissolved solid content is less than 20% by weight, it is difficult to impregnate the thermosetting resin in a necessary amount. On the other hand, if the undissolved solid content exceeds 80% by weight, the thermosetting resin cannot easily be impregnated because its viscosity is elevated by the organic solvent.

Figure 3:
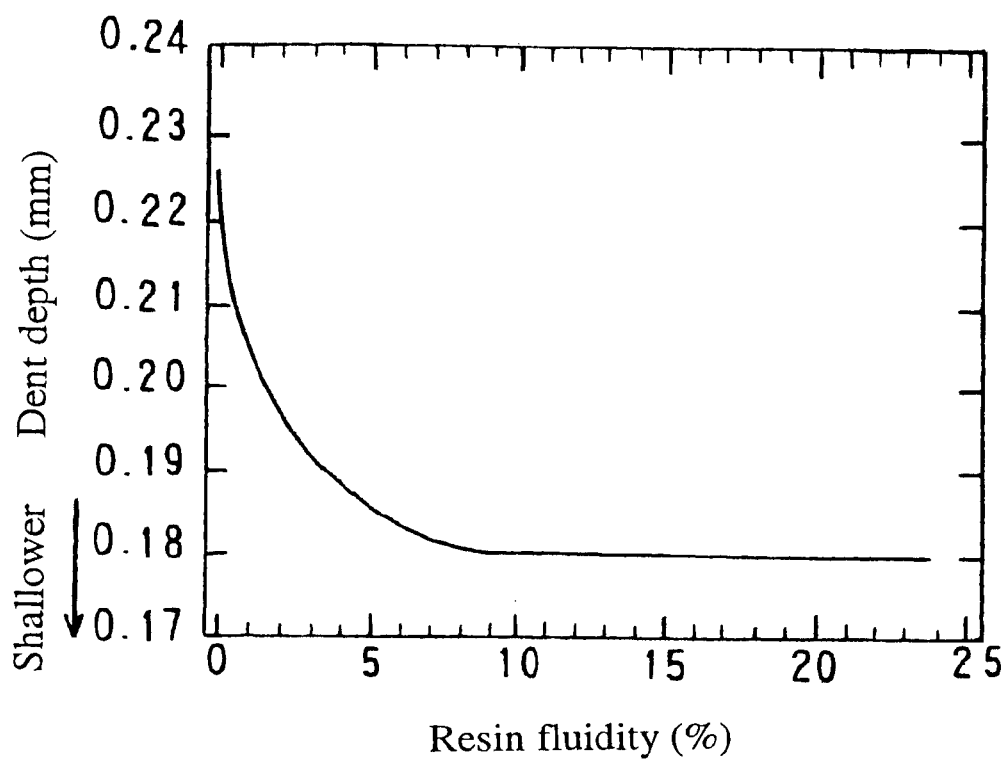
FIG. 3 graphically shows the relation between resin fluidity and dent depth.

According to one embodiment of the present invention, a phenol resin having a fluidity of 3 to 50% in the pre-pregnated status, more preferably, 5 to 20%, is used as the thermosetting resin. If the resin fluidity is more than 50%, the resin will extrude from edges of the sheet when being pressed. As such, it will not assure a sufficient resistance against denting. If the resin fluidity is less than 3%, the sheet base will not sufficiently be combined with the resin which will thus bleed less to the surface of the decorative sheet 3 which will thus not show sufficient dent resistance. It should be noted that the fluidity of the phenol resin in the pre-pregnated status is a percentage of the resin bled out of 10 pre-pregnated sheets of 5 cm in diameter stacked on each other and pressed under predetermined conditions, namely, it is expressed with a weight ratio of bled-out resin/all resin by 100. The relation between this resin fluidity and dent depth is graphically shown in FIG. 3.

The phenol resin contained in the pre-pregnated sheet has a viscosity of 0.1 to 50 poises at a temperature of 25° C. If the viscosity is below 0.1 poise, the phenol resin cannot be impregnated into the sheet base 20 in a sufficient amount that assures a dent resistance, and the phenol resin will easily bleed out from edges of the sheet when being pressed, so that the decorative sheet cannot provide sufficient dent resistance. If the viscosity exceeds 50 poises, the sheet base cannot be impregnated uniformly with the phenol resin, so that the phenol resin bleed out to the surface of the decorative sheet 3 with difficulty when it is pressed. Also in this case, no sufficient dent resistance of the decorative sheet 3 can be assured.

Figure 2:
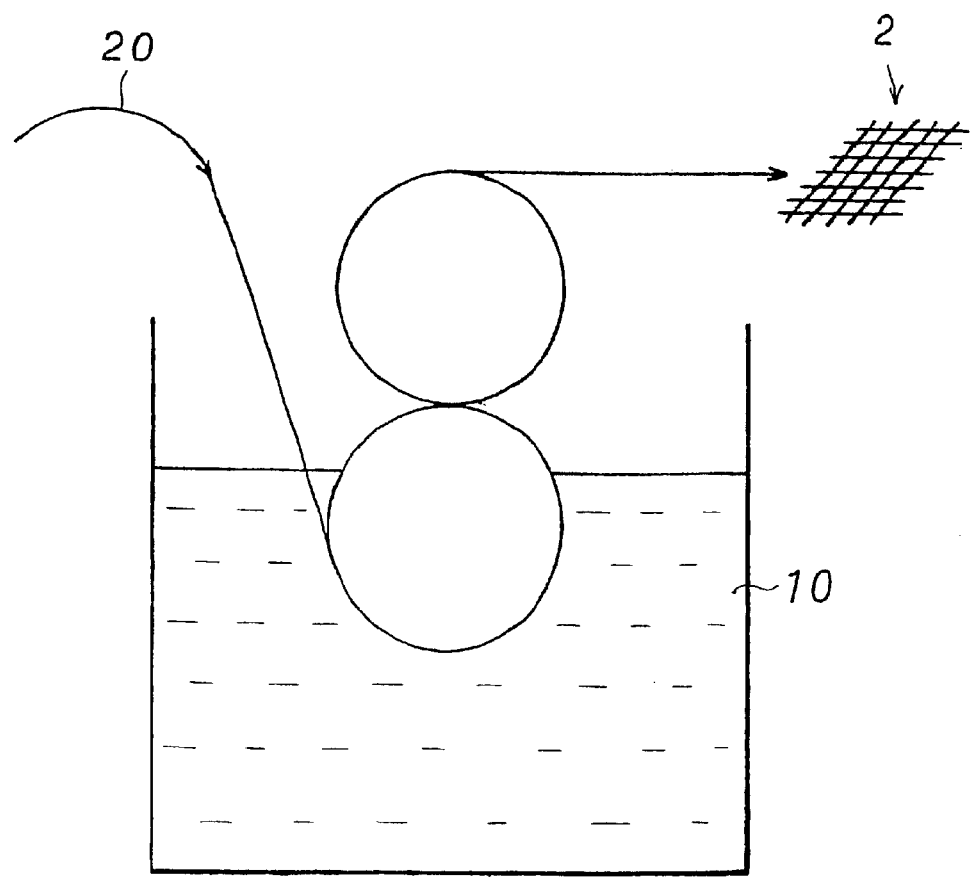
FIG. 2 schematically illustrates the process of forming a sheet.

Phenol resin used as the thermosetting resin should preferably be impregnated into the sheet base 20 to have a solid content of 50 to 500 $g/m^2$, and more preferably, 150 to 350 $g/m^2$. If the solid content is less than 50 $g/m^2$, no sufficient dent resistance can be provided. Unless the solid content is less than 500 $g/m^2$, curing of the phenol resin will take a long time and thus the phenol resin will bleed out from the ends of the sheet base 20, which will esthetically spoil the appearance of the product. The phenol resin is impregnated into the sheet base 20 by dipping into a phenol resin solution 10 the sheet base 20 wound on a roll as shown in FIG. 2 and thereafter drying it under predetermined conditions to provide a pre-pregnated sheet 2.

As having previously been described, the sheet 2 is made of a sheet of paper, woven fabric or nonwoven fabric as the sheet base 20. The sheet base 20 is impregnated with the thermosetting resin as having been described in the foregoing. The sheet 2 may be formed from a plurality of the resin-impregnated sheet bases 20 or from such a sheet base 20 on which a sheet of paper is laminated, for example, but not from a single sheet base 20. For example, the sheet 2 made of a glass nonwoven fabric impregnated with a phenol resin not yet cured, and on which a sheet of paper is laminated, shows a considerably improved strength and dimensional stability of the whole product.

The thermosetting resin should preferably be kept half-cured, namely, pre-pregnated, after being impregnated into the sheet base 20. The pre-pregnated sheet 2 is superposed on the base plate 1, and the decorative sheet 3 is superposed on the sheet 2. Then they are pressed together by hot-press process. They are strongly bonded to each other. The pre-preg is a molding material not yet completely cured while maintaining the adhesiveness and moldability of a reinforced plastic prepared from a fiber reinforcement and thermosetting resin mixed with another thermosetting resin, colorant, curing catalyst, etc. as necessary. The pre-preg should preferably have a gel time of 30 to 800 sec at a temperature of 150° C.

For the thermosetting resin to be cured to a half-cured state after being impregnated into the sheet base 20, the sheet 2 should preferably be dried so that the lower limit of solvent content thereof is 0% by weight, preferably more than 3% by weight, and more preferably more than 5% by weight while the upper limit is less than 15% by weight and more preferably less than 10% by weight. unless the upper limit is less than 15% by weight, the sheets will block together. The relation between the drying time and temperature of a thermosetting resin is shown in Table 1. The thermosetting resin used in the experiments on the drying time and temperature was a phenol resin dissolved or dispersed in methanol as an organic solvent.

TABLE 1

| Temperature (° C.) | Time (min) | | | | | | | | |
|---|---|---|---|---|---|---|---|---|---|
| | 1 | 3 | 5 | 7.5 | 10 | 12.5 | 15 | 20 | 30 |
| 80 | x | x | x | x | x | Δ | Δ | ○ | ○ |
| 90 | x | x | x | Δ | Δ | ○ | ○ | ○ | Δ |
| 100 | x | Δ | ○ | ○ | ○ | ○ | Δ | Δ | x |
| 110 | Δ | ○ | ○ | ○ | Δ | Δ | Δ | x | x |
| 120 | Δ | ○ | ○ | Δ | Δ | Δ | x | x | x |

In Table 1, "○" indicates the formed pre-pregnated sheet is usable, "Δ" indicates that the pre-pregnated sheet is not preferable for use and "x" indicates that the pre-pregnated sheet is unusable.

Table 2 also shows the relation between the drying time and temperature of a thermosetting resin used in the experiments. The thermosetting resin used for these experiments is a phenol resin dissolvable or dispersible in a water

TABLE 2

| Temperature (° C.) | Time (min) | | | | | | | | |
|---|---|---|---|---|---|---|---|---|---|
| | 1 | 3 | 5 | 7.5 | 10 | 12.5 | 15 | 20 | 30 |
| 80 | x | x | x | x | x | x | Δ | ○ | ○ |
| 90 | x | x | x | x | Δ | ○ | ○ | ○ | Δ |
| 100 | x | x | Δ | ○ | ○ | ○ | Δ | Δ | x |
| 110 | x | Δ | ○ | ○ | Δ | Δ | Δ | x | x |
| 120 | Δ | ○ | ○ | Δ | Δ | Δ | x | x | x |

Also in Table 2, "○" indicates the formed pre-pregnated sheet is usable, "Δ" indicates that the pre-pregnated sheet is not preferable for use and "x" indicates that the pre-pregnated sheet is unusable.

As seen from Tables 1 and 2, use of a phenol resin dissolved or dispersed in water or organic solvent permits the formation of a desirably half-cured sheet by drying it at a temperature of 80 to 120° C. for 3 to 30 min.

The tensile strength at break of the pre-preg should preferably be more than 10 kgf/cm$^2$ for a sufficient dent resistance. If the tensile strength at break is less than 10 kgf/cm$^2$, no sufficient dent resistance can be assured. The tensile strength at break was measured according to JIS K 7054. For the measurement, a pre-pregnated sheet 2 put between two release papers was cured by hot-press process under conditions of 10 kgf/cm$^2$ at 150° C. for 5 min.

The decorative sheet 3 should preferably be a decorative wood sheet, a paper sheet having a pattern printed thereon or an embossed paper sheet, having a thickness than 1 mm. These materials for the decorative sheet 3 should also be impregnable with the resin.

The base plate 1, pre-pregnated sheet 2 and decorative sheet 3 should preferably be pressed at a temperature of 130 to 180° C., and more preferably, 140 to 160° C. If the temperature is lower than 130° C., the resin will not be cured sufficiently to provide the desirable dent resistance. If the temperature is higher than 180° C., the resin will be cured too early so that the pre-pregnated sheet 2 cannot be securely bonded to the base plate 1 and decorative sheet 3 and the base plate 1 will warp significantly. The pressure should preferably be 1 to 20 kfg/cm$^2$, and more preferably 5 to 15 kgf/cm$^2$. If the pressure is lower than 1 kgf/cm$^2$, the resin will not sufficiently bleed to the decorative sheet 3 which will thus have a lower dent resistance. If the pressure is higher than 20 kgf/cm$^2$, the base plate 1 will disadvantageously warp significantly. The pressing time should preferably be 2.5 to 20 min, and more preferably 3 to 12.5 min. If the time is shorter than 2.5 min, the resin will not be sufficiently cured so that the decorative sheet 3 will not be sufficiently dent-resistant. If the pressing is made for a time longer than 20 min, the resin will be degraded so that the decorative sheet 3 will not show any sufficient dent resistance and the base plate 1 will warp much.

Embodiment 1

| Base plate 1 | Plywood of 12 mm in thickness |
|---|---|
| Decorative sheet 3 | Hinoki (Japanese cypress) veneer of 0.3 mm in thickness |
| Sheet 2 | Glass nonwoven fabric formed from a mixture of short and long fibers of 10 μm in diameter and having a basic weight of 100 g/m$^2$. The glass nonwoven fabric was impregnated with a water-dispersible phenol resin of 40% in solid content to have a solid content of 200 g/m$^2$. After the impregnation, the glass nonwoven fabric was dried at 105° C. for 10 min to provide a half-cured phenolic resin sheet 2. The resin fluidity was 17%. |

The sheet 2 was superposed on the base plate 1, and further the decorative sheet 3 was superposed on the sheet 2. For lamination, they were pressed with a pressure of 10 kgf/cm$^2$ at 150° C. for 5 min to produce a ligneous finishing material.

Embodiment 2

Similar base plate 1 and decorative sheet 3 to those in embodiment 1 were used. The same glass nonwoven fabric as in embodiment 1 was impregnated with a methanol-dissolvable phenol resin of 60% in solid content to have a solid content of 200 g/m$^2$. After the impregnation, the glass nonwoven fabric was dried at 105° C. for 2.5 min to provide a half-cured phenol resin sheet 2. The resin fluidity was 21%.

The sheet 2 was superposed on the base plate 1, and further the decorative sheet 3 was superposed on the sheet 2. They were pressed under the same conditions as in embodiment 1 except for the pressing time of 10 min to produce a ligneous finishing material.

Comparative Example 1

Similar base plate 1 and decorative sheet 3 to those in embodiment 1 were used. A similar glass nonwoven fabric to that in embodiment 1 was impregnated with a water-dispersible phenol resin of 40% in solid content to have a solid content of 200 g/m$^2$. After the impregnation, the glass nonwoven fabric was dried at 105° C. for 20 min to provide a half-cured phenolic resin sheet 2. The resin fluidity was 1.5%.

The sheet 2 was superposed on the base plate 1, and further the decorative sheet 3 was superposed on the sheet 2. They were pressed under the same conditions as in embodiment 1 to provide a ligneous finishing material.

The embodiments 1 and 2 and comparative example 1 were subjected to a steel ball drop test as prescribed in JIS A-1408. In the test, the sample was supported over sand, a steel ball No. 2 (540 g) was dropped onto the sample, and the depth of a depression formed in the sample was measured. The test results are shown in Table 3.

TABLE 3

| | Depression depth (mm) |
|---|---|
| Embodiment 1 | 0.16 |
| Embodiment 2 | 0.15 |
| Comparative example 1 | 0.24 |

Embodiment 3

| | |
|---|---|
| Base plate 1 | Plywood of 12 mm in thickness |
| Decorative sheet 3 | Hinoki (Japanese cypress) veneer of 0.3 mm in thickness |
| Sheet 2 | Glass nonwoven fabric formed from a mixture of short and long fibers of 10 μm in diameter and having a basic weight of 100 g/m². The glass nonwoven fabric was impregnated with a phenol resin of 25 poises in viscosity at a temperature of 25° C. to have a solid content of 200 g/m². After the impregnation, the glass nonwoven fabric was dried at 105° C. for 10 min to provide a half-cured phenolic resin sheet 2. |

The sheet 2 was superposed on the base plate 1, and further the decorative sheet 3 was superposed on the sheet 2. They were pressed with a pressure of 10 kgf/cm² at 150° C. for 5 min to produce a ligneous finishing material.

Embodiment 4

Similar base plate 1 and decorative sheet 3 to those in embodiment 1 were used. The same glass nonwoven fabric as in embodiment 1 was impregnated with a phenol resin of 2.2 poises (at 25° C.) in viscosity to have a solid content of 200 g/m². After the impregnation, the glass nonwoven fabric was dried at 105° C. for 2.5 min to provide a half-cured phenolic resin sheet 2.

The sheet 2 was superposed on the base plate 1, and further the decorative sheet 3 was superposed on the sheet 2. They were pressed under the same conditions as in embodiment 1.

Comparative Example 2

Similar base plate 1 and decorative sheet 3 to those in embodiment 3 were used. A similar glass nonwoven fabric to that in embodiment 3 was impregnated with a phenol resin of 0.05 poise (at 250° C.). However, the glass nonwoven fabric could not be impregnated in a sufficient amount for the decorative sheet 3 to show sufficient dent resistance.

The embodiments 3 and 4 and comparative example 2 were subjected to the steel ball drop test as prescribed in JIS A-1408. In the test, the sample was supported over sand, a steel ball No. 2 (540 g) was dropped onto the sample, and the depth of a depression formed in the sample was measured. The test results are shown in table 4.

TABLE 4

| | Depression depth (mm) |
|---|---|
| Embodiment 3 | 0.15 |
| Embodiment 4 | 0.15 |
| Comparative example 2 | 0.24 |

Embodiment 5

| | |
|---|---|
| Base plate 1 | Plywood of 12 mm in thickness |
| Decorative sheet 3 | Hinoki (Japanese cypress) veneer of 0.3 mm in thickness |
| Sheet 2 | Glass nonwoven fabric formed from a mixture of short and long fibers of 10 μm in diameter and having a basic weight of 100 g/m². The glass nonwoven fabric was impregnated with a water-dispersible phenol resin of 40% in solid content to have a solid content of 300 g/m². After the impregnation, the glass nonwoven fabric was dried at 105° C. for 10 min to provide a half-cured phenolic resin sheet 2. |

The sheet 2 was superposed on the base plate 1, and further the decorative sheet 3 was superposed on the sheet 2. They were pressed with a pressure of 10 kgf/cm² at 150° C. for 5 min to produce a ligneous finishing material.

Comparative Example 3

A ligneous finishing material was prepared under the same conditions as in embodiment 5 except that the solid content of the glass nonwoven fabric after the impregnation was 20 g/m².

Comparative Example 4

A ligneous finishing material was prepared under the same conditions as in embodiment 5 except that the solid content of the glass nonwoven fabric after the impregnation was 650 g/m².

Embodiment 6

| | |
|---|---|
| Base plate 1 | Plywood of 12 mm in thickness |
| Decorative sheet 3 | Hinoki (Japanese cypress) veneer of 0.3 mm in thickness |
| Sheet 2 | Glass nonwoven fabric formed from a mixture of short and long fibers of 10 μm in diameter and having a basic weight of 100 g/m². The glass nonwoven fabric was impregnated with a methanol-dissolvable phenol resin of 58% in solid content to attain a solid content of 200 g/m². After the impregnation, the glass nonwoven fabric was dried at 105° C. for 10 min to provide a half-cured phenolic resin sheet 2. |

The sheet 2 was superposed on the base plate 1, and further the decorative sheet 3 was superposed on the sheet 2. They were pressed with a pressure of 10 kgf/cm² at 150° C. for 5 min to produce a ligneous finishing material.

Embodiment 7

Similar base plate 1 and decorative sheet 3 to those in embodiment 6 were used. The glass nonwoven fabric as that in embodiment 5 was impregnated with a methanol-dissolvable phenol resin of 58% in solid content to have a solid content of 300 g/m². After the impregnation, the glass nonwoven fabric was dried under the same conditions as in embodiment 5 to provide a half-cured phenolic resin sheet 2.

The sheet 2 was superposed on the base plate 1, and further the decorative sheet 3 was superposed on the sheet 2. They were pressed under the same conditions as in embodiment 5 except for a time of 10 min to provide a ligneous finishing material.

Comparative Example 5

A ligneous finishing material was prepared under the same conditions as in embodiment 6 except that a DAP resin was used instead of the phenol resin used in embodiment 6.

The embodiments 5 to 7 and comparative examples 3 to 5 were subjected to the steel ball drop test as prescribed in JIS A-1408. In the test, the sample was supported over sand, a steel ball No. 2 (540 g) was dropped onto the sample, and the depth of a depression formed in the sample was measured. The test results are shown in Table 5.

TABLE 5

|  | Depression depth (mm) |
| --- | --- |
| Embodiment 5 | 0.14 |
| Embodiment 6 | 0.15 |
| Embodiment 7 | 0.14 |
| Comparative example 3 | 0.28 |
| Comparative example 4 | Not measurable |
| Comparative example 5 | 0.29 |

Embodiment 8

| Base plate 1 | Plywood of 12 mm in thickness |
| --- | --- |
| Decorative sheet 3 | Nara (oak) veneer of 0.3 mm in thickness |
| Sheet 2 | Glass nonwoven fabric formed from a mixture of short and long fibers of 10 μm in diameter and having a basic weight of 100 g/m². The glass nonwoven fabric was impregnated with a water-dispersible phenol resin of 40% in solid content to have a solid content of 200 g/m². After the impregnation, the glass nonwoven fabric was dried at 105° C. for 10 min to provide a half-cured phenolic resin sheet 2. The water content of the sheet 2 was 8% by weight. |

The sheet 2 was superposed on the base plate 1, and further the decorative sheet 3 was superposed on the sheet 2. They were pressed with a pressure of 10 kgf/cm² at 150° C. for 5 min to produce a ligneous finishing material.

Embodiment 9

A ligneous finishing material was prepared under the same conditions as in embodiment 1 except that the water-dispersible phenol resin had a solid content of 300 g/m², the drying temperature and time were 105° C. and 8 min, respectively, and the water content of the half-cured phenolic resin sheet 2 was 10% by weight.

Comparative Example 6

A ligneous finishing material was prepared under the same conditions as in embodiment 8 except that the drying temperature and time were 105° C. and 20 min, respectively, and the water content of the half-cured phenolic resin sheet 2 was 2% by weight.

Comparative Example 7

A ligneous finishing material was prepared under the same conditions as in embodiment 8 except that the drying temperature and time were 105° C. and 3 min, respectively, and the water content of the half-cured phenolic resin sheet 2 was 20% by weight.

Embodiment 10

| Base plate 1 | Plywood of 12 mm in thickness |
| --- | --- |
| Decorative sheet 3 | Hinoki (Japanese cypress) veneer of 0.3 mm in thickness |
| Sheet 2 | Glass nonwoven fabric formed from a mixture of short and long fibers of 10 μm in diameter and having a basic weight of 100 g/m². The glass nonwoven fabric was impregnated with a methanol-dissolvable phenol resin of 58% in solid content to have a solid content of 200 g/m². After the impregnation, the glass nonwoven fabric was dried at 105° C. for 10 min to provide a half-cured phenolic resin sheet 2. |

The sheet 2 was superposed on the base plate 1, and further the decorative sheet 3 was superposed on the sheet 2. They were pressed with a pressure of 10 kgf/cm² at 150° C. for 5 min to produce a ligneous finishing material.

Embodiment 11

Similar base plate 1 and decorative sheet 3 to those in the embodiment 10 were used. The glass nonwoven fabric as that in embodiment 10 was impregnated with a methanol-dissolvable phenol resin of 58% in solid content to have a solid content of 300 g/m². After the impregnation, the glass nonwoven fabric was dried under the same conditions as in embodiment 10 to provide a half-cured phenolic resin sheet 2.

The sheet 2 was superposed on the base plate 1, and further the decorative sheet 3 was superposed on the sheet 2. They were pressed under the same conditions as in embodiment 10 except for a time of 10 min to provide a ligneous finishing material.

The embodiments 8 to 11 and comparative examples 6 and 7 were subjected to the steel ball drop test as prescribed in JIS A-1408. In the test, the sample was supported over sand, a steel ball No. 2 (540 g) was dropped onto the sample, and the depth of a depression formed in the sample was measured. The test results are shown in Table 6.

TABLE 6

|  | Depression depth (mm) |
| --- | --- |
| Embodiment 8 | 0.14 |
| Embodiment 9 | 0.15 |
| Embodiment 10 | 0.15 |
| Embodiment 11 | 0.14 |
| Comparative example 6 | Not measurable (insufficient bonding) |
| Comparative example 7 | 0.28 |

Embodiment 12

| Base plate 1 | Plywood of 12 mm in thickness |
| --- | --- |
| Decorative sheet 3 | Hinoki (Japanese cypress) veneer of 0.3 mm in thickness |
| Sheet 2 | Glass nonwoven fabric formed from a mixture of short and long fibers of 10 μm in diameter and having a basic weight of 100 g/m². The glass nonwoven fabric was impregnated with a water-dispersible phenol resin of 40% in solid content to have a solid content of 200 g/m². After the impregnation, the glass nonwoven fabric was dried at 105° C. for 10 min to provide a half-cured phenolic resin sheet 2. |

The sheet 2 was superposed on the base plate 1, and further the decorative sheet 3 was superposed on the sheet 2. They were pressed with a pressure of 10 kgf/cm² at 150° C. for 5 min to produce a ligneous finishing material.

Embodiment 13

A ligneous finishing material was prepared under the same conditions as in embodiment 12 except that the pressing pressure, temperature and time were 7.5 kgf/cm², 150° C. and 7 min, respectively.

Embodiment 14

A ligneous finishing material was prepared under the same conditions as in embodiment 12 except that a glass nonwoven fabric formed from a mixture of short and long fibers of 10 μm in diameter and having a basic weight of 100 g/m² was impregnated with a methanol-dissolvable phenol resin of 58% in solid content to have a solid content of 200 g/m² and the glass nonwoven fabric thus impregnated with the phenol resin was dried at 105° C. for 10 min to provide a half-cured phenolic resin sheet 2.

Embodiment 15

A ligneous finishing material was prepared under the same conditions as in embodiment 12 except that the same glass nonwoven fabric as in the embodiment 14 was impregnated with a methanol-dissolvable phenol resin of 58% in solid content to have a solid content of 300 g/m² and the glass nonwoven fabric was dried under the same conditions as in embodiment 14 to provide a half-cured phenolic resin sheet 2.

Comparative Example 8

A ligneous finishing material was prepared under the same conditions as in embodiment 12 except that the pressing pressure, temperature and time were 0.8 kgf/cm², 125° C. and 2 min, respectively.

Comparative Example 9

A ligneous finishing material was prepared under the same conditions as in embodiment 12 except that the pressing pressure, temperature and time were 25 kgf/Cm², 185° C. and 25 min, respectively.

The embodiments 12 to 15 and comparative examples 8 and 9 were subjected to the steel ball drop test as prescribed in JIS A-1408. In the test, the sample was supported over sand, a steel ball No. 2 (540 g) was dropped onto the sample, and the depth of a depression formed in the sample was measured. The test results are shown in Table 7.

TABLE 7

|  | Depression depth (mm) |
|---|---|
| Embodiment 12 | 0.15 |
| Embodiment 13 | 0.16 |
| Embodiment 14 | 0.15 |
| Embodiment 15 | 0.14 |
| Comparative example 8 | 0.30 |
| Comparative example 9 | 0.27 |

Embodiment 16

| Base plate 1 | Plywood of 12 mm in thickness |
|---|---|
| Decorative sheet 3 | Hinoki (Japanese cypress) veneer of 0.3 mm in thickness |
| Sheet 2 | Glass nonwoven fabric formed from a mixture of short and long fibers of 10 μm in diameter and having a basic weight of 100 g/m². The glass nonwoven fabric was impregnated with a water-dispersible phenol resin of 40% in solid content to have a solid content of 200 g/m². After the impregnation, the glass nonwoven fabric was dried at 105° C. for 10 min to provide a half-cured phenolic resin sheet 2. |

The sheet 2 was superposed on the base plate 1, and further the decorative sheet 3 was superposed on the sheet 2. They were pressed with a pressure of 10 kgf/cm² at 150° C. for 5 min to produce a ligneous finishing material.

Embodiment 17

A ligneous finishing material was prepared under the same conditions as in the embodiment 16 except that the glass nonwoven fabric was impregnated with a water-dispersible phenol resin of 40% in solid content to have a solid content of 300 g/m² to provide the sheet 2.

Embodiment 18

| Base plate 1 | Plywood of 12 mm in thickness |
|---|---|
| Decorative sheet 3 | Nara (oak) veneer of 0.3 mm in thickness |
| Sheet 2 | Glass nonwoven fabric formed from a mixture of short and long fibers of 10 μm in diameter and having a basic weight of 100 g/m². The glass nonwoven fabric was impregnated with a methanol-dissolvable phenol resin of 58% in solid content to attain a solid content of 200 g/m². After the impregnation, the glass nonwoven fabric was dried at 105° C. for 10 min to provide a half-cured phenolic resin sheet 2. |

The sheet 2 was superposed on the base plate 1, and further the decorative sheet 3 was superposed on the sheet 2. They were pressed with a pressure of 10 kgf/cm² at 150° C. for 5 min to produce a ligneous finishing material.

Embodiment 19

Similar base plate 1 and decorative sheet 3 to those in the embodiment 18 were used. The glass nonwoven fabric as that in the embodiment 18 was impregnated with a methanol-dissolvable phenol resin of 58% in solid content to have a solid content of 300 g/m². After the impregnation, the glass nonwoven fabric was dried under the same conditions as in embodiment 16 to provide a half-cured phenolic resin sheet 2.

The sheet 2 was superposed on the base plate 1, and further the decorative sheet 3 was superposed on the sheet 2. They were pressed under the same conditions as in embodiment 18 except that the time was 10 min.

Comparative example 10

A ligneous finishing material was prepared under the same conditions as in the embodiment 16 except that the sheet 2 was made from a kraft paper impregnated with a similar phenol resin to that in embodiment 16.

The embodiments 16 to 19 and comparative example 10 were subjected to the steel ball drop test as prescribed in JIS A-1408. In the test, the sample was supported over sand, a steel ball No. 2 (540 g) was dropped onto the sample, and the depth of a depression formed in the sample was measured. The test results are shown in Table 8.

TABLE 8

|  | Depression depth (mm) |
| --- | --- |
| Embodiment 16 | 0.15 |
| Embodiment 17 | 0.14 |
| Embodiment 18 | 0.15 |
| Embodiment 19 | 0.14 |
| Comparative example 10 | 0.28 |

Embodiment 20

| Base plate 1 | Plywood of 12 mm in thickness |
| --- | --- |
| Decorative sheet 3 | Hinoki (Japanese cypress) veneer of 0.3 mm in thickness |
| Sheet 2 | Glass nonwoven fabric formed from a mixture of short and long fibers of 10 $\mu$m in diameter and having a basic weight of 100 g/m$^2$. The glass nonwoven fabric was impregnated with a water-dispersible phenol resin of 40% in solid content to have a solid content of 200 g/m$^2$. After the impregnation, the glass nonwoven fabric was dried at 105° C. for 10 min to provide a half-cured phenolic resin sheet 2. |

The sheet 2 was superposed on the base plate 1, and further the decorative sheet 3 was superposed on the sheet 2. They were pressed with a pressure of 10 kgf/cm$^2$ at 150° C. for 5 min to produce a ligneous finishing material.

Embodiment 21

Similar base plate 1 and decorative sheet 3 to those in embodiment 20 were used. The glass nonwoven fabric as that in embodiment 20 was impregnated with a water-dispersible phenol resin of 40% in solid content to have a solid content of 300 g/m$^2$. Alter the impregnation, the glass nonwoven fabric was dried under the same conditions as in embodiment 20 to provide a half-cured phenolic resin sheet 2.

The sheet 2 was superposed on the base plate 1, and further the decorative sheet 3 was superposed on the sheet 2. They were pressed under the same conditions as in embodiment 20 except that the time was 10 min.

Embodiment 22

Similar base plate 1 and decorative sheet 3 to those in embodiment 20 were used. The same glass nonwoven fabric as that in embodiment 20 was impregnated with a water-dispersible phenol resin of 54% in solid content to have a solid content of 200 g/m$^2$. After the impregnation; the glass nonwoven fabric was dried under the same conditions as in embodiment 20 to provide a half-cured phenolic resin sheet 2.

The sheet 2 was superposed on the base plate 1, and further the decorative sheet 3 was superposed on the sheet 2. They were pressed under the same conditions as in embodiment 20.

Embodiment 23

The base plate 1, decorative sheet 3 and glass nonwoven fabric were the same as in embodiment 20. The glass nonwoven fabric was impregnated with a water-dissoluble phenol resin of 54% in solid content to have a solid content of 300 g/m$^2$. The fabric was dried under the same conditions as in embodiment 21 to provide a half-cured phenolic resin sheet 2.

The sheet 2 was superposed on the base plate 1, and further the decorative sheet 3 was superposed on the sheet 2. They were pressed under the same conditions as in embodiment 2.

The phenol resins used in embodiments 20 to 23 are different from each other as shown in Table 9.

TABLE 9

|  | Embodiment 20 | Embodiment 21 | Embodiment 22 | Embodiment 23 |
| --- | --- | --- | --- | --- |
| Dispersibility/dissolubility | Dispersible | Dispersible | Dissoluble | Dissoluble |
| Solid content (%) | 40 | 40 | 54 | 54 |
| Solid content of sheet after impregnation (g/m$^2$) | 200 | 300 | 200 | 300 |

Comparative Example 11

A ligneous finishing material was prepared under the same conditions as in embodiment 20 except that a DAP resin was used instead of the phenol resin used in embodiment 20.

The embodiments 20 to 23 and comparative example 11 were subjected to the steel ball drop test as prescribed in JIS A-1408. In the test, the sample was supported over sand, a steel ball No. 2 (540 g) was dropped onto the sample, and the depth of a depression formed in the sample was measured. The test results are shown in Table 10.

TABLE 10

|  | Depression depth (mm) |
| --- | --- |
| Embodiment 20 | 0.15 |
| Embodiment 21 | 0.14 |
| Embodiment 22 | 0.16 |
| Embodiment 23 | 0.15 |
| Comparative example 11 | 0.29 |

As having been described in the foregoing, the ligneous finishing material according to the present invention comprises a base plate, sheet formed from a sheet base impregnated with a thermosetting resin, and a decorative sheet impregnable with a resin, these component layers being bonded together by a hot-press process. The thermosetting resin has a fluidity of 3 to 50% in its pre-pregnated status. Thus, the thermosetting resin in the sheet is impregnated into the decorative sheet and cured to improve the dent resistance of the decorative sheet. Also, the base plate, sheet and decorative sheet can be laminated on each other just by a hot-press process, requiring no bonding agent for bonding the decorative sheet to the base plate. Thus, the ligneous finishing material according to the present invention is easy to produce. Furthermore, the sheet provided between the decorative sheet and base plate assures an excellent dimensional stability against changes of temperature and humidity and enhances the strength of the ligneous finishing material. Use of a phenol resin soluble or dispersible in water or organic solvent enables the production of the ligneous finishing material at lower costs and more easily and also enhances the dent resistance of the ligneous finishing material.

What is claimed is:

1. A ligneous finishing material comprising:

a base plate;

a sheet formed from a sheet base impregnated with a thermosetting resin and attached to said base plate, said sheet having a solid content of 50 g/m² to 500 g/m² and a tensile strength at break of at least 10 kgf/cm²; and a decorative sheet impregnable with a resin and attached to said sheet;

said base plate, said sheet and said decorative sheet being laminated on each other by a hot-press process;

said sheet base being a glass nonwoven fabric made of only glass fiber or a mixture of glass fiber and other fiber, the glass nonwoven fabric having a basic weight of 10 g/m² to 1,000 g/m² and being formed from a mixture of short fibers having a length of 3 mm to 15 mm and long fibers having a length of 10 mm to 50 mm, the short fibers being in an amount of at least 20% of the amount of fiber in the glass nonwoven fabric.

2. A ligneous finishing material comprising:

a base plate;

a sheet formed from a sheet base impregnated with a thermosetting resin and attached to said base plate, said sheet having a solid content of 50 g/m² to 500 g/m² and a tensile strength at break of at least 10 kgf/cm²; and a decorative sheet impregnable with a resin and attached to said sheet;

said base plate, said sheet and said decorative sheet being laminated on each other by a hot-press process;

said sheet base being a glass nonwoven fabric made of only glass fiber or a mixture of glass fiber and other fiber, the glass nonwoven fabric having a basic weight of 10 g/m² to 1,000 g/m², wherein the glass nonwoven fabric consists of short fibers having a length of 3 mm to 15 mm.

* * * * *